April 23, 1968 — W. G. GREEN — 3,379,633
ELECTRIC AND ION GENERATOR
Filed Nov. 30, 1966
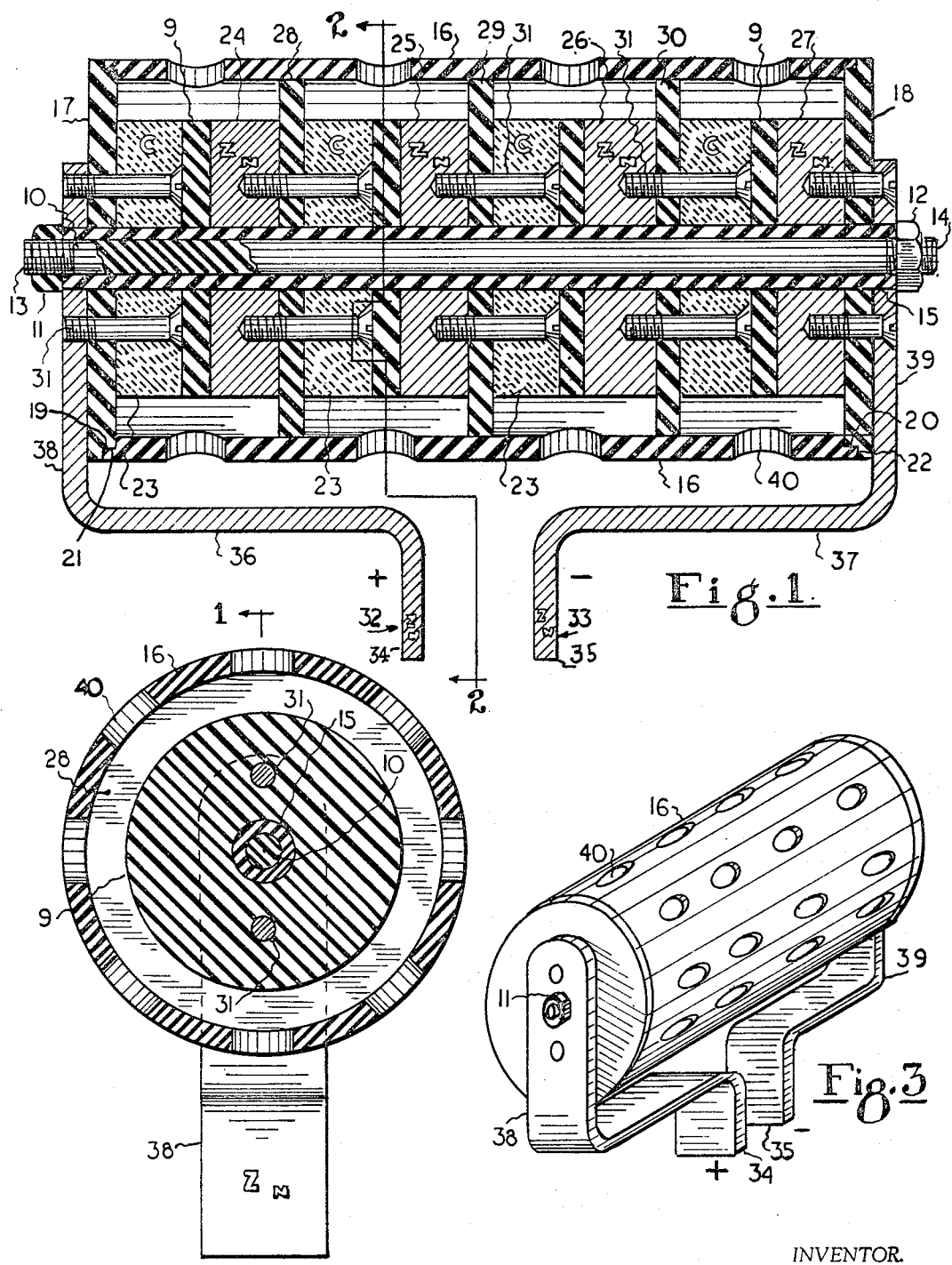
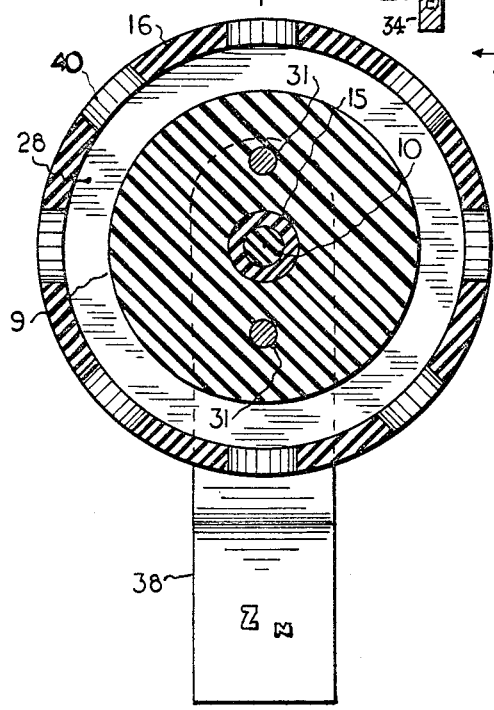
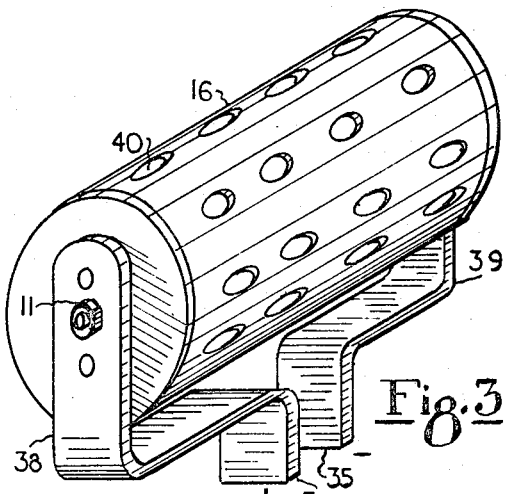
INVENTOR.
WILLIAM. G. GREEN
BY
James Hanson Bowen
ATTORNEY

3,379,633
ELECTRIC AND ION GENERATOR
William G. Green, 4925 Camellia Way S.,
St. Petersburg, Fla. 33705
Continuation-in-part of application Ser. No. 340,921,
Jan. 29, 1964. This application Nov. 30, 1966, Ser.
No. 614,378
3 Claims. (Cl. 204—248)

The present invention relates to a new development in electro-chemical generators of electricity and the incidental liberation of metal and gaseous ions from the electrodes and the electrolytes utilized.

U.S. Patent No. 3,241,512, issued Mar. 22, 1966, to applicant, describes a generator of chlorine gas and the production of ions of copper, from copper electrodes and seawater as the electrolyte, for the purpose of providing an antifouling "atmosphere" or environment for a boat or other marine installation in which barnacles, algae, and the like, have been quite effectively controlled, and the boat bottoms have been found, after long periods, to remain completely clean and free of fouling, and of teredo worms and barnacles. In this work, as in further development of the device described in the original application, Ser. No. 340,921, now abandoned, of which this is a continuation-in-part, it has been determined that chlorine is liberated from sea-water, or any brackish water, such as water which originally contained only a few parts per million of chlorides, but which, due to normal concentration, resulting from evaporation and recirculation, may be concentrated (as in air conditioning cooling towers) to 500 p.p.m. or more, by the passage of an electric current from one electrode to another, with the total voltage between the electrodes being as low as 1 volt, and the current being as low as 0.001 ampere per square inch of electrode area.

In the above described Patent No. 3,241,512, the electric current was provided from a power source of conventional type, such as batteries, or rectified alternating current. This, of course, greatly increases the cost of the equipment, and of the operation.

In other co-pending applications applicant has described electro-chemical water treating devices, including self-powered electro-chemical cells, utilizing the coolant water of internal combustion engines as the electrolyte, and which have, for a number of years, been successful in removing and preventing scale resulting from the use of hard water. (Ser. No. 350,766, filed Mar. 10, 1964, and U.S. Patent No. 3,095,365 W. G. Green.)

Measurements and observation of these devices indicate that substantial work can be done (i.e., minerals precipitated, or gases liberated) with the voltages and currents that can be produced by properly designed electro-chemical cells, such as the device shown in FIGURE 1 of this application.

Therefore, one of the purposes of this invention is to provide a self-powered generator of electric current, utilizing electro-positive and electro-negative electrodes, chosen to provide the ions desired, and to liberate chlorine gas, utilizing the electrolyte to be treated, such as seawater, or other brackish water, and which will be of low first cost; low operating cost; and with a life expectancy of at least one year.

Since the control or elimination of algae in a cooling tower, the control of bacteria and algae in a swimming pool, and the elimination of fouling of marine installations by barnacles, algae, and teredo worms, must be continuously and economically accomplished.

Another purpose of this invention is to provide a self-powered source of chlorine gas and metal ions, which will operate continuously for very long periods.

Still another purpose of this invention is to provide a means for controlling algae, bacteria, and minute marine organisms, which is self-contained, and self-powered, and requires no external water circulating means.

Since it is well known in the art, and to the world generally, that metal ions are the most dependable bactericides known, and that chlorine gas, although of more temporary effectiveness, is a positive and quick bactericide, it is considered sufficient to describe the production of these, rather than to delve in detail into the effects of the ions and gases.

Still another purpose of the present invention is to provide a design capable of indefinite expansion, in order to treat greater volumes of water (or larger boat or marine installations); or conversely to treat more concentrated bacteria or pollution, in a given volume of water (as a given swimming pool will require more chlorine where used by many persons, than if used by a few).

Since dry-cell batteries, connected in series to increase the voltage from the single cell value (usually 1½ volts) to multiples of that value, must have their elements insulated, one from the other, in order to accomplish the multiple voltage requirement, and since seawater is a very good electrical conductor, means is provided for making the "leakage path" between cells as long as practicable, this being a part of the invention, and being necessary to obtain as large a voltage as is required.

Still another purpose of the invention is to cause a general circulation of the water, both within the generator, and generally throughout the vessel, or area in which the generator is installed. This is accomplished by providing openings all around the casing of the cells, with a set of openings for each cell, so that no matter which way it is positioned horizontally in the water, there will be some openings on the bottom and some on the top, so that the gas bubbles resulting from electro-chemical action —$Cl_2$, $O_2$, and H, and $CO_2$, among others, will float upward, through the holes, thus causing a general movement of the water upward and out of the generator, whereupon other water will move in from below to replace the water removed. This circulation is quite evident, and is sufficient to bathe a boat bottom with gas bubbles, which, on still days, may be observed all around the boat, at the water line.

On marine installations it is sufficient for the bubbles to move upward. In swimming pools there is almost always a circulating pump, so that any chlorine or metal ions going into the water will be completely mixed, throughout the pool. For killing algae or bacteria in ponds, wind circulation should provide sufficient mixing for this purpose.

The particular embodiment of the invention shown in FIGURES 1, 2, and 3 utilizes electrodes of carbon and zinc, and four cells are shown, thus providing approximately 6 volts. In the model constructed and tested, in which the outer casing measured 4" inside diameter, the current produced at 5 volts, was about 0.008 ampere. It is obvious that the electrodes could be of other materials; the method of fastening, and the materials for insulation could be varied without interfering with the intended operation.

In FIGURE 1, external electrodes are shown. In practice it has been determined that very effective $Cl_2$ and metal ion liberation is accomplished within the cells; thus, the external electrodes may be short-circuited with an insulated wire (to prevent electrolysis of the wire, which provides maximum electrode use) or a resistor may be inserted to limit the current flow and thus increase the electrode life. It should be obvious that for any volume of water determined to be necessary, the electrode dimension may be determined to provide the necessary current, and sufficient cells may be used to provide desired voltage, thus satisfying almost any requirement.

Other and further objects and advantages of the present invention will be apparent from the following description taken in connection with the drawings, wherein:

FIGURE 1 is a section taken on line 1—1 of FIGURE 2 showing the construction of the generator.

FIGURE 2 is a section taken in line 2—2 of FIGURE 1 showing the construction and shape of the generator.

FIGURE 3 is a perspective view of the device showing the exterior appearance thereof.

In the accompanying drawings, and in the following specification, the same reference characters are used to designate the same parts and elements throughout and in which the numeral 10 refers to a Bakelite shaft having nuts 11 and 12 on threaded ends 13 and 14 thereof, numeral 15 indicating a tube positioned on the shaft 10, numeral 16 indicating a perforated cylinder positioned around and spaced from the tube 15, the cylinder being mounted on the sube 15 by circular end plates 17 and 18 having annular shoulders 19 and 20 of the end plates nested in annular recesses 21 and 22 of the cylinder 16, numeral 23 indicating carbon discs positioned on the tube 15, numerals 24, 25, 26 and 27 indicating zinc discs, the outside diameters of which are less than the inside diameter of the cylinder 16, numerals 28, 29 and 30 indicating large discs of insulating material, the outside diameters of which are equal to the inside diameter of the cylinder, numeral 9 indicating small discs of insulating material, numeral 31 indicating screws securing the discs together, and numerals 32 and 33 indicating brackets of a yoke having handles 34 and 35, bars 36 and 37, and end sections 38 and 39 between which the discs are positioned. The cylinder 16 is provided with perforations 40 to facilitate circulation of solutions through the generator.

The ion generator includes zinc and carbon discs mounted in a cylindrical casing of electrical insulating material, and with insulation between the discs, and the casing is supported by a yoke having end sections 38 and 39 extended from the handles 34 and 35. This permits the fluid to circulate through and around the discs.

The operation of the generator is such that upon being immersed in a solution an electro-chemical action takes place between the solution and the carbon and zinc elements, thereby generating an electrical potential of 1½ volts for each carbon and zinc element.

The generator shown in FIGURE 1 will produce a potential of 6 volts of direct current and it will be understood that by increasing the quantity of carbon and zinc elements used the resulting voltage will be in direct proportion to the number of such elements used. In the operation of the generator the elements zinc are consumed and zinc ions are imparted to the solution. These are bactericides and will destroy algae and bacteria in the treated water.

In life tests performed on electrode materials an average period for 85% consumption of electrodes was:

| Material (in.) | Current, amps, per square inch | Days to 85% utilization | Thickness required for 1 year (in.) |
| --- | --- | --- | --- |
| Aluminum 0.027 | 0.003 | 39 | 0.250 |
| Do | .001 | 117 | 0.0843 |
| Carbon 0.500 | .003 | (1) | 0.500 |

1 No apparent loss in 39 days.

Control of the current to minimum amount required will increase the life of the electrodes, as consumption of the cathode is exactly proportional to the current flow.

For the positive electrode, in some cases a metal surface coated with ground graphite, in a matrix of polyvinylchloride cement, has been found to be conductive, and effective as an anode. This method of construction lends itself to rapid and economical manufacture, and permits of the provision of cells which are expendable, that is, it is more economical to put in a new cell than to clean or repair the old one. In such a case, all the parts required for the cell are punch-press parts, long known to be the lowest cost parts from metal. In larger electrodes, since the PVC-carbon mixture on drying tended to crack, if thickly applied, a strengthening grid of inert material, such as nylon screen, was first affixed to the metal connector, and then coated with the carbon mixture, much as lead-acid storage battery plates are made.

What is claimed is:

1. In a generator for production of chlorine gas, dissolved in water, the combination which comprises:
    (a) means for production of metal ions for treatment of water, and,
    (b) means for control of bacteria, algae, and marine organisms comprising:
    (c) an insulating, chemically inert, casing,
    (d) means for sealing the casing at the ends,
    (e) said casing containing cells,
    (f) sealed barriers positioned between the cells for insulating one cell from another,
    (g) each cell containing a pair of dissimilar electrodes, electro positive and electro negative with respect to each other, at least one of said electrodes being metallic;
    (h) the dissimilar electrodes of the adjoining cells being electrically connected in series, for addition of EMFs,
    (i) each of the cells having a disc of insulating material between the electrodes thereof, and a space between said electrodes and said casing extending around the electrodes of each cell,
    (j) said space to be filled with sea water when the generator is immersed therein,
    (k) said casing having upper and lower sets of openings in the wall thereof and positioned opposite the spaces between the electrodes of each cell, for the escape of gases, causing the water charged with metal ions and chlorine to flow upward with the bubbles of gas for replacement of the charged water with fresh electrolyte through the openings in the lower part of the casing, the path for current leakage through the electrolyte being made purposely as long and as devious as practicable within the dimension limitations of the equipment for the production of the greatest amount of current and voltage for the dimensions used,
    (l) electrical connection terminals at opposite ends of the casing connected to end electrodes of said series of cells and for attaching to control equipment for reducing the current and electrode consumption to the minimum amount required for maintaining the bactericidal conditions required.
    (m) which generator, in combination with an electrolyte such as sea water or the like will generate sufficient electric current, at a sufficient voltage to liberate chlorine gas and metal ions, circulating the ions and gas throughout the area above the generator such as by means of the gas bubbles, thus maintaining an environment of $Cl_2$ gas and metal ions for the control of algae, bacteria, and marine organisms, above and adjacent to the generator, as described.

2. A generator for the production of chlorine gas, dissolved in water, and metal ions, for use in the treatment of water for the control of bacteria, algae, and marine organisms; comprising
    (a) an insulating, chemically inert, casing, sealed at the ends and containing cells,
    (b) sealed barriers for insulating the cells from each other,
    (c) pairs of dissimilar electrodes (electro-positive, and electro-negative), with respect to each other contained in each cell, at least one of said electrodes being metallic,
    (d) the dissimilar electrodes of adjoining cells being electrically connected, to form a series of cells,
    (e) said cells having a disc of insulating material between the electrodes of each cell, and a space extending around the electrodes between the electrodes and the casing, said spaces being filled with sea water when the generator is immersed therein, (f) said casing having upper and lower sets of openings for passage of water therethrough, (g) said openings being also provided for the escape of gases and water charged with metal ions and also for the replacement of charged water with fresh electrolyte through the lower sets of openings thereof, (h) said generator having a leakage path through the electrolyte and said leakage path being provided as long and as devious as practicable within the dimension limitations of the generator for the production of the greatest amount of current and voltage for the dimensions used;

(i) electrical connection terminals positioned on opposite ends of the generator casing connected to the end electrodes of said series of cells, for attaching to control equipment for reducing the current, and electrode consumption to the minimum amount required for maintaining the bactericidal condition required, (j) which generator, in combination with an electrolyte, such as sea water, or other brackish water will generate sufficient electric current, at a sufficient voltage, to liberate chlorine gas and metal ions, circulating such products throughout the area above the generator, actuated by upward circulation of bubbles, and thus maintaining an environment of $Cl_2$ gas and metal ions for the control of algae, bacteria, and marine organisms, as described.

3. A generator for the production of chlorine gas, dissolved in water, and metal ions useful in the treatment of water, for the control of bacteria, algae, and marine organisms, comprising an insulating, chemically inert, casing, sealed at the ends, and containing cells, insulated one from another by sealed barriers; each cell containing a pair of dissimilar electrodes (electro-positive and electro-negative with respect to each other) at least one of said electrodes being metallic, the dissimilar electrodes of the adjoining cells being electrically connected, so as to connect the cells in series, for addition of EMFs, a disc of insulating material between the electrodes of each cell, and a space extending around the electrodes of each cell between said electrodes and said casing, to be filled with sea water or other electrolyte, when the generator is immersed therein, top and bottom sets of holes in the outer casing, opposite the spaces between the electrodes, for the escape of gases, and water charged with metal ions, and for the replacement of the charged water with fresh electrolyte through the bottom sets of holes, the leakage path through the electrolyte being purposely made as long and as devious as practicable within the dimension limitations of the equipment, for the production of the greatest amount of current and voltage for the dimensions used; electrical connection terminals at opposite ends of the casing connected to the end electrodes of said series of cells for attaching to control equipment for reducing the current (and electrode consumption) to the minimum amount required for maintaining the bactericidal conditions required; which generator, in combination with an electrolyte, such as sea water or other brackish water, will generate sufficient electric current, at a sufficient voltage, to liberate chlorine gas and metal ions, circulating them throughout the area above the generator by means of the gas bubbles, thus maintaining an environment of $Cl_2$ gas and metal ions for the control of algae, bacteria, and marine organisms above and adjacent to the generator, as described.

References Cited

UNITED STATES PATENTS

| | | | |
|---|---|---|---|
| 540,608 | 6/1895 | Collier et al. | 204—248 |
| 647,409 | 4/1900 | Hudson et al. | 204—248 |
| 1,862,663 | 6/1932 | Curtis | 204—275 |
| 2,639,306 | 5/1953 | Fischback | 136—112 |
| 2,931,849 | 4/1960 | Burrell | 136—102 |

HOWARD S. WILLIAMS, *Primary Examiner.*

D. R. VALENTINE, *Assistant Examiner.*